United States Patent [19]
Clancy

[11] 3,872,295
[45] Mar. 18, 1975

[54] APPARATUS FOR INSPECTING CONFINED AREAS ADJACENT THE FLOOR

[76] Inventor: William B. Clancy, 5606 Rolling Ridge Dr. East, San Antonio, Tex. 78228

[22] Filed: May 3, 1974

[21] Appl. No.: 466,532

Related U.S. Application Data

[63] Continuation-in-part of Ser. No. 336,232, Feb. 27, 1973, Pat. No. 3,816,738.

[52] U.S. Cl. ............... 240/2.18, 240/4.2, 240/6.4 R
[51] Int. Cl. .............................................. F21l 1/00
[58] Field of Search .......... 240/2.18, 6.4 R, 2 R, 4.2

[56] References Cited
UNITED STATES PATENTS
2,188,677  1/1940  Dickinson ............................ 240/4.2
2,580,699  1/1952  Pfetzing ............................. 240/2.18

FOREIGN PATENTS OR APPLICATIONS
1,081,511  6/1954  France ............................. 240/2.18

*Primary Examiner*—R. L. Moses
*Attorney, Agent, or Firm*—Willard J. Hodges, Jr.

[57]  ABSTRACT

A portable device for inspecting confined areas adjacent the floor in food warehouses and the like. The device incorporates a self-contained light source in conjunction with a tiltable control mirror. An extension handle permits rolling the device along the floor adjacent the area to be inspected while adjusting the mirrors for the optimum view.

5 Claims, 4 Drawing Figures

APPARATUS FOR INSPECTING CONFINED AREAS ADJACENT THE FLOOR

CROSS REFERENCES

Application is a continuation in part and improvement over the inventor's co-pending U.S. Application Ser. No. 336,232, filed 2-27-73, entitled "Convertible Floor Sanitary Inspection Device," now U.S. Pat. No. 3,816,738.

BACKGROUND OF THE INVENTION

1. Field of the Invention

The device of this invention pertains to a combination of a light source and mirror for inspecting confined areas such as underneath storage pallets, storage bins, and confined or partially obscured floor areas. Recent emphasis by States and the Federal Government on sanitation standards in food handling, process and storage facilities, creates a need and impetus to a device with the capabilities of this invention.

2. Description of Prior Art

A closely related invention is U.S. Pat. No. 2,580,699 "An Apparatus for Viewing the Undercarriage of a Vehicle." Periscope type devices have been developed for inspection of the interior of conduits, tanks and other confined areas. To the best of the knowledge of your inventor no device which can be rolled along the floor and inspect a confined area, parallel to the floor, has heretofore been developed other than Applicant's copending device and this invention.

SUMMARY OF THE INVENTION

A desire to produce a compact, portable self-contained device prompted your inventor, who has been associated with the food industry for several years, to develop this invention. The device is mounted on four rollers recessed in a housing or case. Lights, a power source, a wiring harness are secured to the floor plate of the device, and inspection mirrors are tiltably mounted in a frame. Tilt support brackets project from the mirror frame, as well as a control arm, with interconnecting linkage secured to a tilt windlass in elongation of the telescoping control handle. The composite apparatus permits the inspection of a floor area by an individual standing adjacent the device.

For a detailed description of the construction and operation of the device your attention is invited to the attached drawings wherein identical reference characters refer to identical or equivalent components throughout the several views and the description.

DESCRIPTION OF THE PREFERRED EMBODIMENT

Figure 1:
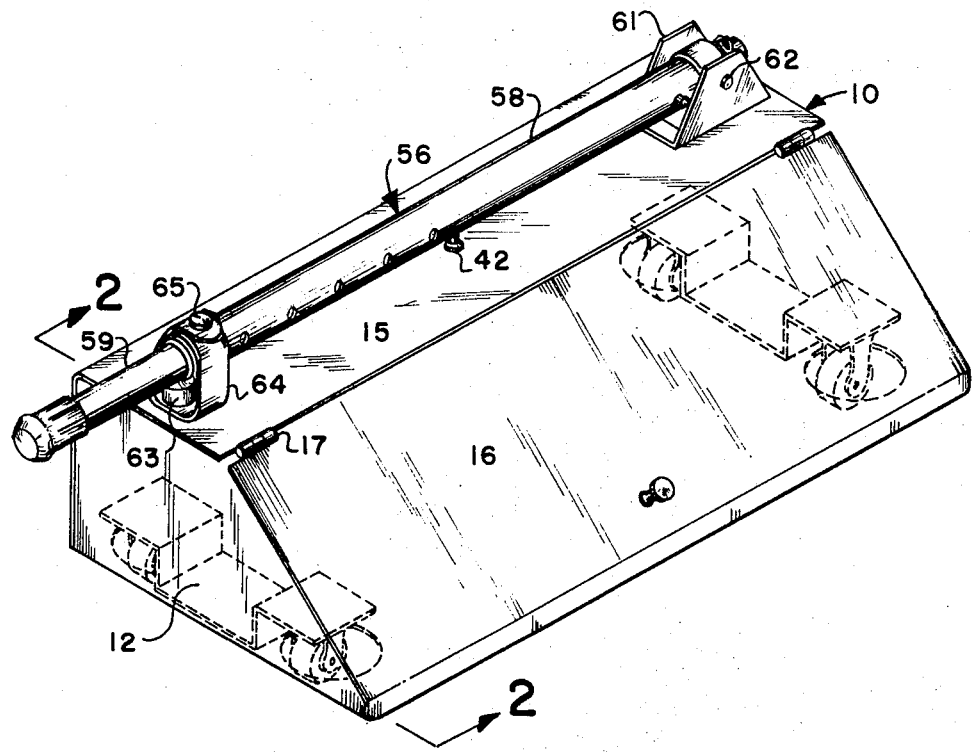
FIG. 1 is an isometric view of the device in the closed, portable carrying position partially fragmented.

The preferred embodiment was constructed primarily of sheet metal using well known sheet metal forming techniques. Mild sheet steel was used in the construction of the preferred embodiment; however, a wide variety of metals or materials including plastics might be employed.

The outer case 10 was an elongated box-like structure of the general configuration illustrated in the drawings. The device included a floor plate 11 to which was securely attached a first end wall 12 and a second end wall 13. Projecting normal to floor plate 10 was a vertical back wall 14. The roof of the device comprises a top plate 15 projecting at right angles to back wall 14 and terminates at a line substantially above the midpoint of floor plate 11. A diagonal front flap 16 is secured to top plate 15 by means of flap hinge 17 completing the outer configuration of the outer case 10. To make the device mobil, caster means are employed. This means comprises a first stationary caster 18 and a second stationary caster 19 recessed in first caster well 20 and second caster well 21 adjacent first end wall 12. To support and stabilize the device closely adjacent the floor a stationary caster recess support 22 is employed. This device is of angular construction and comprises a floor support section 23, a first caster arm 24 and a second caster arm 25. The foregoing configuration is as substantially illustrated in FIG. 2.

Figures 2, 3:
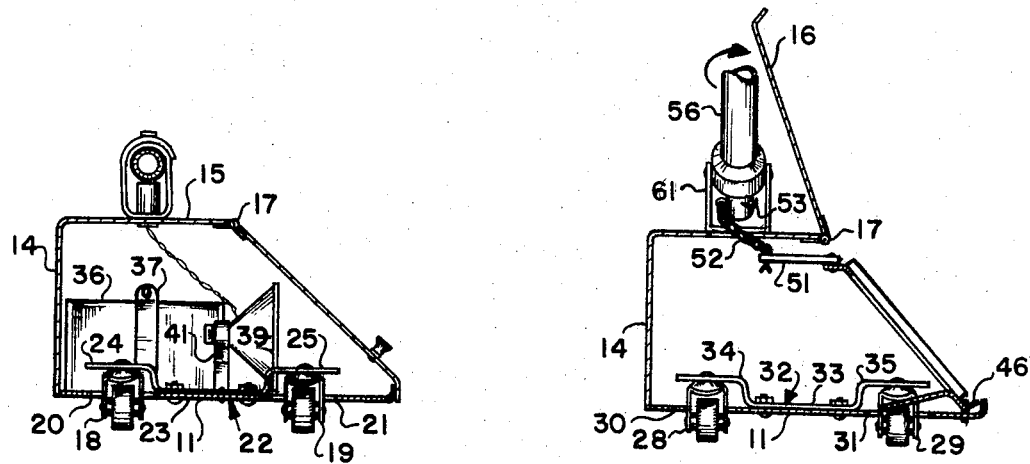
FIG. 2 is a sectional view of the device taken on line 2—2 of FIG. 1 looking in the direction of the arrows.
FIG. 3 is a sectional view of the device taken on line 3—3 of FIG. 4 looking in the direction of the arrows.
Figure 4:
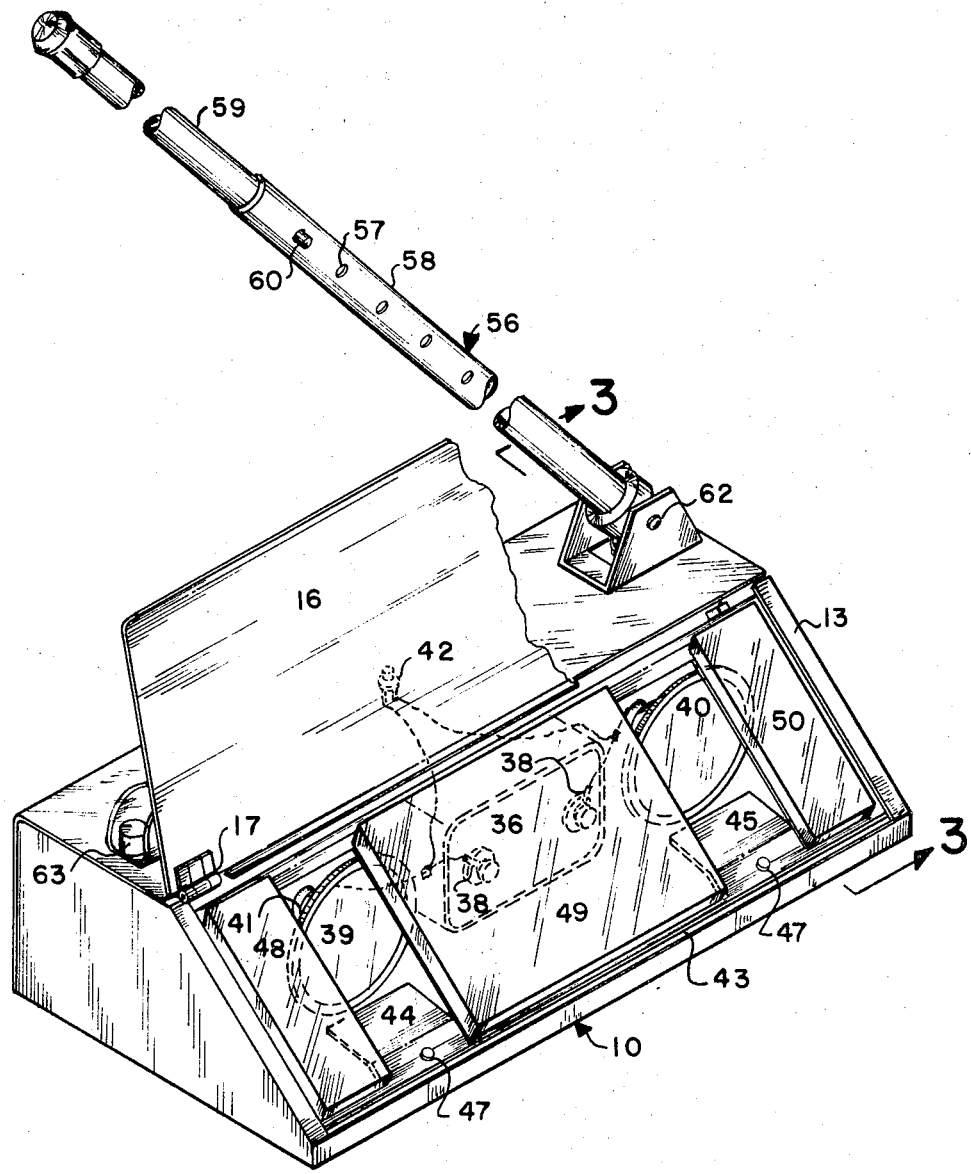
FIG. 4 is an isometric view of the device in the open, operable position simulating a rolling of the device along the floor inspecting an adjacent area.

For the construction of the caster means at the opposite ends of the device, your attention is invited to FIG. 3. The first swivel caster 28, second swivel caster 29 are mounted in recesses in floor plate 11 of the device and are designated as first swivel caster well 30 and second swivel caster well 31. Supports for these caster means is of a configuration as substantially previously described and comprises swivel caster recess support 32 having a floor support section 33 which parallels and is secured to floor plate 11 and has a first swivel caster recess arm 36 and a second swivel caster recess arm 35. Mounted on floor plate 11 between the above described caster means is a battery 36 secured to floor plate 11 by battery hold-down means 37. This means 37 may be a strap, a catch, or a metal bracket as utilized in the preferred embodiment. Leading from battery 36 is a wiring harness 38 connected to a first spotlight 39 and a second spotlight 40. These spotlights 39 and 40 are tiltably secured to floor plate 11 by means of spotlight mounting means 41. In the preferred embodiment, the wiring harness 38 included an on-off switch 42 which was mounted substantially in the center of top plate 15, and was of the push button on-off configuration. Adjacent to and substantially parallel to diagonal front flap 16 was tiltably mounted a mirror frame 43 which was of sheet metal construction and included or had securely attached thereto a first tilt support foot 44 and a second tilt support foot 45. These projections extended inward from mirror frame 43 adjacent first spotlight 39 and second spotlight 40. The edge of these tilt support feet 44 and 45 contact floor plate 11 to limit the movement of mirror frame 43. The bottom edge of mirror frame 43 fits into a channel-like recess secured to or formed in floor plate 11 which is designated as mirror frame tilt channel 46. Projecting upward from this channel 46 were two threaded bolt-like projections securely attached to floor plate 11 projecting through mirror frame 43 terminating in threaded retainers comprising tilt pivots 47. Secured in mirror frame 43 was a first mirror 48 adjacent first spotlight 39. The center section of frame 43 is occupied by center mirror 49 and a smaller mirror section designated as second mirror 50 is mounted adjacent second spotlight 40. One or more mirrors might be employed in the device of this invention; however, the preferred embodiment which has proved highly satisfactorily utilized the above three mirrors in the configuration as best illustrated in FIG. 4.

For an illustration of the tilt mechanism, your attention is particularly invited to FIG. 3. Projecting at an angle from mirror frame 43 was securely attached tilt control arm 51. A short section of chain was secured to tilt control arm 51 and comprises tilt linkage 52. This tilt linkage 52 is secured to and may be would around tilt windlass 53 which is secured to the bottom end of telescoping control handle 56. This control handle 56 has two functions. When in the collapsed position, as illustrated in FIG. 1, it comprises a handle for carrying the device; whereas, in the extended position, illustrated in FIG. 4, it comprises a device for rolling the apparatus along the floor while controlling the angle of tilt of mirror frame 43. This angle is adjusted for optimum viewing of an adjacent floor area. The telescoping control handle 56 is constructed with adjusting appertures 57 in the outer sleeve 58. There is secured to inner sleeve 59 of control handle 56 a spring loaded adjusting catch 60. This ball-like projecting catch is capable of engaging adjusting appertures 57 in outer sleeve 58 making the composite structure substantially rigid. The bottom edge of the telescoping control handle 56 is tiltably secured to top plate 15 of outer case 10 by a U-shaped control handle tilt bracket 61. Tilt pin 62 secures handle 56 to bracket 61. A small cylindrical support project upward from top plate 15 forming a rest on which control handle 56 is supported. This structure is designated as control handle support 63. A strap-like structure forming a loop projected outward from each side of control handle support 63 and encircled telescoping control handle 56 forming a control handle carrying strap 64. The two ends of this strap were secured by strap catch 65 which encircled and retained the control handle 56 in the carrying position illustrated in FIG. 1.

OPERATION OF THE DEVICE

The operation of the device is rather self-evident from the foregoing description and inspection of the attached drawings. The device in the closed portable carrying position is as illustrated in FIG. 1. In this configuration the device is highly portable and may be hand carried to any location desired. To inspect a floor area the device is placed on the floor and supported by the stationary casters 18 and 19 and the swivel casters 28,29. Strap catch 65 is released and telescoping control handle 56 extended. Diagonal front flap 16 is raised and spotlights 39,40 are activated by on-off switch 43. In this position, the operator may look down into the mirrors 48,49,50 which normally presents a view of adjacent floor area. In the normal position these mirrors project at substantially 45° angle from the floor; accordingly, the area parallel the floor is viewed in a plane upward from the mirrors. The device may be optionally positioned on a floor immediately adjacent or at a distance from the area to be inspected. The operator's line of sight, standing adjacent the device, is deflected 90° by the mirrors 48,49, and 50 permitting a viewing of a floor area either adjacent or at a distance from the device. For slight adjustments of the mirrors 48,49,50 a rotation of telescoping control handle 56 will tension tilt linkage 52 around the tilt windlass 53 varying the angle of the mirror frame 43 for viewing.

Having described the construction and operation of the device, what is desired to be claimed is all embodiments of the device as well as modifications not departing from the scope of the equivalents of the appended claims.

I claim:

1. An apparatus for inspecting confined areas adjacent the floor comprising:
   a. an outer case having a first end and a second end,
   b. a floor plate comprising the lower extremity of said outer case,
   c. multiple casters recessed in said floor plate, said casters adapted to roll along a surface supporting said floor plate adjacent the surface,
   d. a tiltable mirror means flexibly supported at substantially a 45° angle on said floor plate,
   e. a tilt linkage secured to said mirror means adapted to tilt said mirror means responsive to a tensioning or releasing of tension of said tilt linkage,
   f. a rotatible control handle mounted on said outer case, and
   g. a tilt windlass attached to said control handle and to said tilt linkage, said tilt windlass tensioning or relaxing tension of said tilt linkage responsible to rotate said control handle.

2. The invention of claim 1 wherein said tiltable mirror means and said spotlight comprise:
   a. a first mirror, and a second mirror spaced from said first mirror, and
   b. a spotlight mounted adjacent to the spacing of said first mirror and said second mirror, said spotlight adapted to project a light beam through the space between said first mirror and said second mirror.

3. The invention of claim 1 wherein said multiple casters further comprise:
   a. a swivel caster mounted adjacent one end of said outer case, and
   b. a fixed caster mounted adjacent a second end of said outer case.

4. The invention of claim 1 wherein said multiple casters are mounted in:
   a. caster wells constructed in said floor plate, said casters being attached to and supported by,
   b. multiple caster recess supports secured to said floor plate and supporting said casters in said caster wells.

5. The invention of claim 1 wherein said tilt mirror means further comprises:
   a. a mirror frame tiltably mounted on said floor plate, said mirror frame including,
   b. a tilt support foot projecting at an angle from said mirror frame, said support foot contacting said floor plate thereby limiting the degree of tilt of said mirror frame.

* * * * *